United States Patent
Weyman et al.

[11] Patent Number: 5,910,065
[45] Date of Patent: Jun. 8, 1999

[54] TRANSMISSION WITH CREEP GEAR

[75] Inventors: Roger Michael Weyman; John Graham Willacy, both of Coventry, United Kingdom

[73] Assignee: AGCO Limited, Coventry, United Kingdom

[21] Appl. No.: 08/891,575

[22] Filed: Jul. 11, 1997

[30] Foreign Application Priority Data

Jul. 26, 1996 [GB] United Kingdom .................. 9615703

[51] Int. Cl.⁶ .............................. F16H 37/02; F16H 1/32
[52] U.S. Cl. ............................................ 475/207; 475/178
[58] Field of Search ................................... 475/162–181, 475/204–207

[56] References Cited

U.S. PATENT DOCUMENTS

| | | | |
|---|---|---|---|
| 1,944,789 | 1/1934 | Gravely | 475/178 X |
| 1,988,636 | 1/1935 | Thomas et al. | 475/179 X |
| 3,430,523 | 3/1969 | Merritt. | |
| 3,903,750 | 9/1975 | Takasu. | |
| 4,348,918 | 9/1982 | Fukui. | |
| 5,167,590 | 12/1992 | Kratochvil et al. | 475/178 |
| 5,211,611 | 5/1993 | Lammers et al. | 475/178 |
| 5,468,193 | 11/1995 | Yamaguchi | 475/162 |

FOREIGN PATENT DOCUMENTS

| | | |
|---|---|---|
| 444790 | 9/1991 | European Pat. Off. . |
| 2617951 | 10/1977 | Germany . |
| 19529312A1 | 3/1996 | Germany . |
| 63214542 | 9/1988 | Japan . |
| 929339 | 9/1963 | United Kingdom . |
| 956383 | 4/1964 | United Kingdom . |
| 1145266 | 3/1969 | United Kingdom . |
| 1270266 | 4/1972 | United Kingdom . |
| 1384321 | 2/1975 | United Kingdom . |
| 1462372 | 1/1977 | United Kingdom . |
| 2194991 | 3/1988 | United Kingdom . |
| 2221278 | 1/1990 | United Kingdom . |
| 2089932 | 6/1992 | United Kingdom . |

*Primary Examiner*—Khoi Q. Ta
*Attorney, Agent, or Firm*—MacMillan, Sobanski & Todd, LLC

[57] ABSTRACT

A transmission, particularly an agricultural tractor transmission, has a creep gear facility whereby speeds under 0.5 km per hour are possible without slipping a clutch. Planocentric gearing (20) is used for the creep gear, selectively clutchable into the transmission by means of a dog clutch (31). The planocentric gearing comprises an input eccentric (32) which runs inside an inner ring member (33) carrying external gear teeth (34). The inner ring (33), in use, oscillates within an outer ring (36) having interior gear teeth (35) with which the exterior teeth (34) mesh at one point at any given time. Pins (38) are mounted on the inner ring (33) which are received in apertures (47) in a stationary reaction member (44). The oscillating motion of the inner ring (33) is transferred to the outer ring (36) as rotation, at a reduced speed from the input, giving a reduction ratio of 10:1 or higher in a single stage. The direction of the drive is preserved from input to output.

7 Claims, 2 Drawing Sheets

TRANSMISSION WITH CREEP GEAR

FIELD OF THE INVENTION

The present invention relates to transmissions for vehicles, especially tractors, which allow selection of a gear to provide for very low speeds to be maintained without slipping a clutch. An agricultural tractor, for example, with such a transmission might be used for operating an implement such as a ditch digger which needs to be moved through the ground at a very low speed, eg under 0.5 kilometers per hour.

Such transmissions are known which employ conventional reduction gearing on two parallel shafts, or alternatively using multiple stage epicyclic gearing. In each case, in order to provide a very high reduction ratio (eg 10–1) in the creep gearset, multiple stages are required with consequent complexity, costliness, physical size and low efficiency.

The object of the present invention, therefore, is to provide a transmission with a creep facility which is simple, compact and inexpensive while also being reasonably efficient.

DESCRIPTION OF THE PRIOR ART

A gear arrangement known as planocentric gearing has been known for some time in non-vehicle applications eg machine tools where a high reduction ratio is required. Such gearing involves the following four main components:

1. an outer ring member;
2. an inner ring member disposed within the outer ring member, the inner and outer rings having complementary intermeshing surfaces, such as gear teeth, and the inner ring member having apertures or recesses in it, or alternatively projections;
3. a reaction member, having a number of axially extending projections which extend into the apertures or recesses in the inner ring member, or alternatively a number of apertures or recesses into which projections on the inner member extend;
4. an eccentric disposed within the inner ring member, a bearing being provided between the eccentric and the inner circumference of the inner ring member.

The outer ring member is normally held fixed and an input shaft connected to the eccentric, rotation of which causes the inner ring member to oscillate within the outer ring member. As it oscillates it develops a rotation at a considerably slower speed than the speed of the input shaft. This rotation is transferred via the projections to the reaction member which becomes the output of the gear system. The apertures in the inner ring member are large enough, and the projections of small enough diameter, that the inner ring member is free to oscillate, although any rotational movement around the axis of the system is transferred to the reaction member via the projections.

Planocentric gearing typically provides reduction ratios of the order of 50:1 and has been used in the past principally in static installations and machines where very high reduction is required. This type of gearing has not generally been used in vehicle applications and, in particular, not in a main vehicle transmission. In general, the relatively small magnitude of reduction required for a vehicle transmission is not suited to planocentric gearing. The type of planocentric gearing described above also has the problem that it reverses the direction of the drive between input and output, making it a less obvious choice for vehicle applications since reversing gearing would need to be used to change the direction of the output from the planocentric.

SUMMARY OF THE INVENTION

According to the present invention, a vehicle transmission comprises a first gear box providing a plurality of selectable ratios and a planocentric gearset selectively couplable to the first gear box.

A conventional gear box on, say, a tractor, may thus be supplemented by a planocentric gearset which might normally remain disengaged until "creep" mode is required, at which time the planocentric gearset could be engaged by means of a clutch, dog clutch or any other suitable means.

The invention stems partly from the realisation that, since planocentric gearing can, at one extreme, provide a reduction ratio of the order of 10:1, it might be used to provide the exceptionally large reduction, by vehicle transmission standards, required for a tractor creep facility. In this case, the planocentric's characteristics of compactness and an acceptable level of efficiency give rise to great advantages. The compactness of the planocentric gearing means that it may be used relatively easily to adapt a transmission without a creep facility into one which does, since its size means that either no re-design or a relatively minor re-design of the transmission casing is required. Alternatively it may be substituted for a conventional, eg multiple planetary, creep gearset to provide a lower creep speed in the same or less space, with the same or greater efficiency.

A further advantage which planocentric gearing shares with planetary gearing over parallel shaft gearing is that its input and output are concentric.

The disadvantage of the planocentric gearing described above is that the direction of the rotation is reversed between the input and output shafts. In order to employ a planocentric gearset in a tractor creep transmission, for example, an additional direction reversing stage would normally be required. However, if the reaction member is kept static and the output instead taken from the outer ring then the direction of rotation is preserved from the input to the output. Accordingly, it is preferred in the vehicle transmission according to the invention that the direction of the drive is preserved from input to output. One way of achieving this is to have the input to the planocentric gearset at the eccentric and the output at the outer ring member.

In vehicle transmission applications, it is particularly desirable for gearing to be compact. It is also, as explained above, necessary for such applications to use the lower end of the range of ratios which are feasible for a single stage planocentric to provide. Both these factors involve placing considerable stress on the projections on the inner ring or reaction member. For this reason, it is preferable to mount a stiffening ring on the distal ends of the projections to distribute the load around all the projections, instead of it being concentrated at one.

Preferred reduction ratios for the planocentric gearset in the vehicle transmission according to the invention are between 5:1 and 35:1, more preferably 7:1 to 15:1, eg around 10:1.

DESCRIPTION OF THE PREFERRED EMBODIMENT

Figure 1:
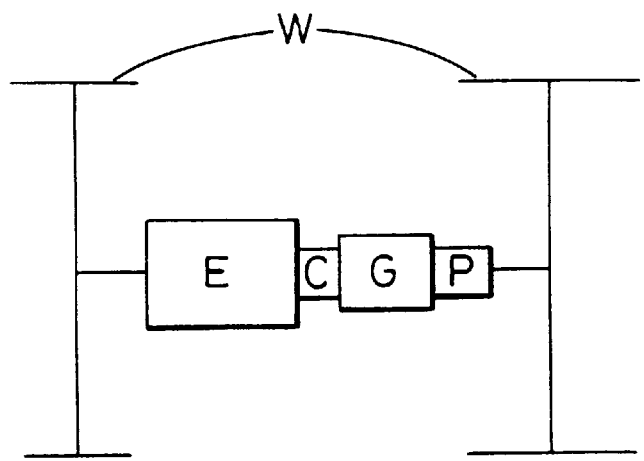
FIG. 1 is a schematic representation of the main elements of a tractor driveline.

Referring to FIG. 1, a tractor driveline comprises wheels W, an engine E, clutch C and, in accordance with the present invention, a gearbox G with a planocentric creep gearset P.

Figure 2:
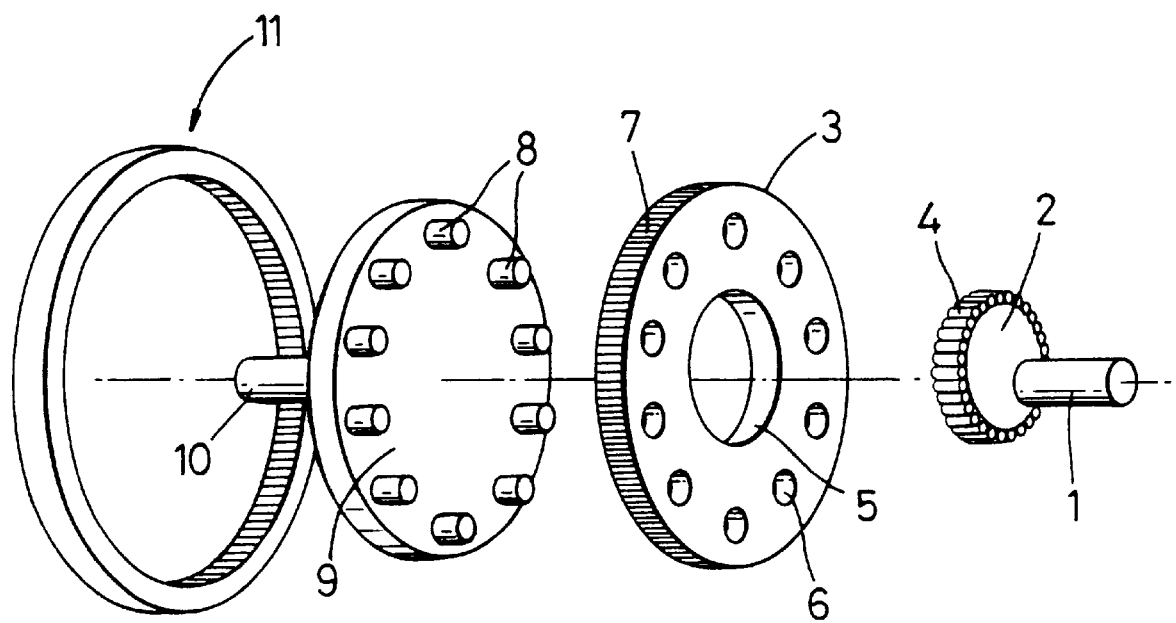
FIG. 2 is an exploded schematic representation of a planocentric gearset suitable for incorporation into a transmission according to the invention.

The planocentric gearset is similar in principle to that shown schematically in FIG. 2. FIG. 2 illustrates the four basic elements of a planocentric gearset, namely an eccentric 2, inner ring 3, reaction member 9 and outer ring 11. Input is conventionally at the eccentric 2, as is the case in the particular system described here. The eccentric 2 carries bearings 4 which run on an interior bearing surface 5 on the inner ring 3. As the eccentric 2 rotates in the inner ring 3, an oscillating movement is imparted to the inner ring 3.

The inner ring is located within the outer ring 11 and a set of exterior gear teeth 7 on the inner ring 3 mesh at one point with interior gear teeth 12 on the outer ring 11. The point at which the two sets 7, 12 of teeth mesh moves around as the inner ring 3 oscillates, and the interaction between the two sets of teeth gives rise to rotation of the inner ring 3 at a much slower speed than that of the input shaft 1 and eccentric 2. In alternative designs there could be a friction engagement between the inner and outer rings, or a cycloidal surface could be provided on the inner ring, with rollers on the outer ring, resulting in a pure rolling engagement between inner and outer rings.

The inner ring 3 conventionally has recesses or, in this case, apertures 6 formed in it. In these are loosely received projections or pins 8 projecting from a reaction member 9, in the form of a simple disc. This member would normally be mounted on bearings to rotate about the same axis as the input shaft 1. The rotary motion of the inner ring 3 is imparted to the reaction member 9, but the oscillating motion is not imparted since the apertures 6 in the inner ring simply move around the pins 9. The output is conventionally a shaft 10 connected to the reaction member 9.

Figure 3:
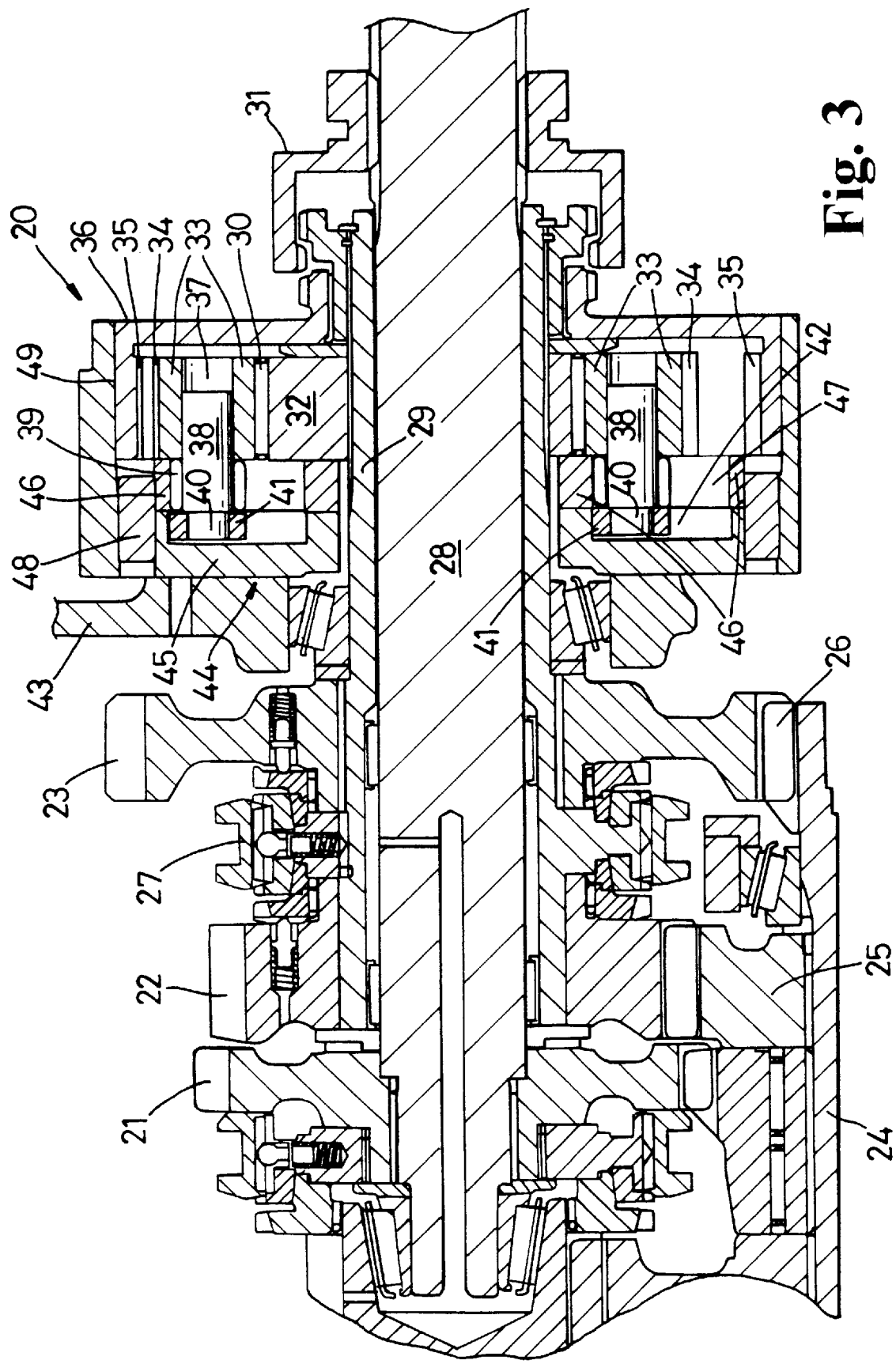
FIG. 3 is a sectional side view of part of a tractor transmission according to the invention.

Turning now to FIG. 3, in this embodiment, a planocentric creep gearset, shown generally at 20, is incorporated in the transmission of an agricultural tractor. FIG. 3 shows the rear portion of the transmission, the creep gearset 20 being located at the extreme rear end adjacent gears 22, 23 providing "medium" and "low" ranges respectively.

In this particular transmission, the creep facility is provided for use only in medium or low range and therefore the operation of high range will not be described here.

In medium and low ranges, the drive input is from shaft 24 which carries gears 25, 26 permanently in mesh with medium and low range gears 22, 23 respectively. The drive output is taken from output shaft 28.

A synchromesh mechanism 27 connects either low range gear 23 or medium range gear 22, to an intermediate shaft 29 located coaxially around the output shaft 28. A dog clutch comprises a clutch member 31 splined to the output shaft 28 and axially shiftable between a first position in which it connects the intermediate shaft 29 to the output shaft 28 and a second position in which the output shaft 28 is connected with the output of the planocentric creep gearset 20.

The planocentric gearset 20 comprises an input eccentric 32 splined to the intermediate shaft 29. The eccentric 32 rotates inside an inner ring member 33, with bearing rollers 30 running between the eccentric 32 and the inner bearing surface of the inner ring member 33 (see corresponding parts 2, 3, 4, 5 shown in FIG. 2 for a clearer representation of this). Gear teeth 34 are formed on the outer periphery of the inner ring 33. Complementary gear teeth 35 are formed on the interior of an outer ring member 36. These two sets 34, 35 mesh at one point at any given moment as the inner ring 33 oscillates; FIG. 3 shows that point at the top of the gearset 20.

The inner ring 33 has eight bores 37 drilled in it at equal radial intervals. In each of these is received a pin 38, which is retained in the bore by an interference fit. Each pin 38 projects from its bore 37 to the left of the body of the inner ring 33 in FIG. 3, and the projecting part of each pin 38 carries a roller bearing 39. At the end of the projecting part of each pin 38 is a reduced diameter portion 40, and a stiffening ring 41 is fitted on to the pins 38 at the reduced diameter portions 40 via apertures in the ring 41.

Fixedly mounted to the transmission casing 43 is a reaction member 44, comprising a cup shaped member 45 with a central aperture to allow shafts 28, 29 to pass through it. The cup 45 has an annular recess 42 on its right hand face in FIG. 3 in which is received the end portions of the pins 38 bearing the stiffening ring. Mounted on the right hand side (in FIG. 3) of the cup member 45, and forming part of the reaction member 44, is a disc member 46 having a series of eight apertures 47 spaced at equal radial intervals. In each aperture 47 is received the part of corresponding pin 38 carrying the bearing 39. The inner surface of each aperture 47 in the disc member 46 thus constitutes a bearing surface. Two dowels 48 located at 180° apart prevent relative rotation between the disc 45 and the second disc member 46.

The outer ring 36 runs on an interior bearing surface 49 on the cup member 45.

In this embodiment, the output is taken from the outer ring member 36. As shown in FIG. 3, the dog clutch member 31 is slidable either to connect the output shaft 28 to the intermediate shaft 29 or to the outer ring member 36. The reaction member 44, comprising the cup member 45 and disc member 46, is fixedly mounted to the transmission casing 43. This is different from the conventional arrangement where output is taken from the reaction member (as in the arrangement shown in FIG. 2). The result is that the direction of the drive is preserved from input to output.

Another difference with the conventional planocentric gearing shown in FIG. 2 is that the pins 38 are mounted on the inner ring member 33 rather than on the reaction member 44. This has been found to enable a planocentric gearset to be constructed as a more compact unit for a given ratio.

The stiffening ring 41 has been incorporated because of the very great magnitude and unevenness of the stresses on the pins 38. In this application the ratio is at the smaller end of the range of ratios which it is feasible for a planocentric to provide, and the stresses on the pins are therefore very high in this case. Furthermore, only one pin tends to carry all the load at any given time. Hence the incorporation of the stiffening ring which distributes the load around all the pins.

The high stresses on the pins also make the bearings 39 desirable to avoid excessive wear and seizure of the planocentric.

In operation, creep mode would be engaged by the tractor operator whilst the tractor is stationary. As discussed above, creep is only available in the medium or low range. A creep control in the tractor cab would be operated to engage creep, which would cause movement of the dog clutch 31 from a position to the right of that shown in FIG. 3 (connecting shafts 28 and 29) to a position to the left of that shown, in which the outer ring 37 is connected to the output shaft 28.

Creep mode would be used for example when operating an implement such as a ditch digger which needs to be moved through the ground at a very low speed. A typical creep speed might be 0.5 km per hour or lower. In this example, speeds down to 0.2 km per hour are available, the creep gearset providing an additional 10:1 reduction over the ratio provided by the remainder of the transmission.

We claim:

1. A vehicle transmission comprising:
   an input shaft;
   an output shaft;
   a gear box including an input drive driven by said input shaft and an output drive driven by said input drive at any one of a plurality of selectable ratios;
   a planocentric gearset; and
   a coupling mechanism operable in a first mode, wherein said output shaft is driven by said output drive bypassing said planocentric gearset, and a second mode, wherein said output shaft is driven by said output drive through said planocentric gearset so as to provide an additional range of gears.

2. A vehicle transmission as claimed in claim 1 wherein the planocentric gearset includes an input and an output driven by said input, and a direction of drive is preserved from said input of said planocentric gearset to said output of said planocentric gearset.

3. A vehicle transmission as claimed in claim 2, wherein said input to said planocentric gearset is at an eccentric gear of said planocentric set and said output is at an outer ring of said planocentric set.

4. A vehicle transmission as claimed in claim 1, wherein said planocentric set includes an inner ring and wherein projections are mounted on said planocentric inner ring, projecting axially therefrom, which projections carry a stiffening ring at the ends thereof remote from said inner ring.

5. A vehicle transmission as claimed in claim 1, wherein said planocentric set includes a reaction member and wherein projections are mounted on said reaction member so as to project axially from said reaction member, which projections carry a stiffening ring at the ends thereof remote from said reaction member.

6. A vehicle transmission as claimed in claim 1 wherein said planocentric gearset provides a reduction ratio in the range 5:1 to 35:1.

7. An agricultural tractor having a transmission as claimed in claim 1.

* * * * *